AGENTS FOR THE MANUFACTURE OF NON-STICK COATINGS

Siegfried Nitzsche and Heinrich Marwitz, Burghausen, and Friedrich Hockemeyer, Reischach, West Germany, assignors to Wacker-Chemie GmbH, Munich, Germany
No Drawing. Filed June 22, 1972, Ser. No. 265,115
Claims priority, application Germany, June 25, 1971,
P 21 31 740.8
Int. Cl. C08f 11/04
U.S. Cl. 260—46.5 UA — 5 Claims

ABSTRACT OF THE DISCLOSURE

A non-stick coating composition comprising (1) organopolysiloxanes having silicon bonded vinyl groups as the terminal units, (2) organopolysiloxanes having at least 3 silicon bonded hydrogen atoms per molecule and (3) a curing catalyst obtained from the reaction of chloroplatinic acid and a ketone. The composition may be applied to any solid surface and cured at an elevated temperature to form a non-stick coating thereon.

---

The present invention relates, in particular, to the nature of the curing catalysts in agents for the manufacture of non-stick organopolysiloxane coatings.

It is known that surfaces of paper or other solid substances can be coated with organopolysiloxane in order to prevent sticky substances from adhering firmly to these surfaces (compare, for example, W. Noll "Chemie und Technologie der Silicone" ("Chemistry and Technology of the Silicones"), Weinheim, 1968, pages 520/521).

As compared to other, previously known, agents for the manufacture of non-stick organopolysiloxane coatings, the agents according to the invention in particular have the advantages that they gel considerably less rapidly, that is to say that they have a very long pot life, and that they nevertheless display a very high speed of curing at the curing temperatures used in practice. As a result of the long pot life, losses through premature gelling of the coating solution are avoided; as a result of the very high speed of curing, better utilization of the coating machines is achieved. Furthermore, the coatings adhere particularly firmly to the substrates, and are very rub-resistant.

It is particularly surprising that the agents according to the invention combine the property of possessing an extremely long pot life with the property of curing very rapidly at temperatures above 80° C., even if they do not contain any agents which extend the pot life, such as tetramethylguanidinecarboxylate, perchloroethylene or silazanes, because according to the invention platinum catalysts are used and the previously known platinum catalysts in most cases are effective even at room temperature (compare, for example, U.S. Pat. No. 3,383,356).

The subject of the invention are agents for the manufacture of non-stick coatings based on (1) diorganopolysiloxanes possessing reactive end groups in the terminal units,
(2) organopolysiloxanes possessing at least 3 Si-bonded hydrogen atoms per molecule and
(3) curing catalysts, characterized in that they contain, as diorganopolysiloxanes (1) possessing reactive end groups, diorganopolysiloxanes possessing Si-bonded vinyl groups in the terminal units, that they contain, as organopolysiloxanes (2) possessing Si-bonded hydrogen, those with at least one terminal Si-bonded hydrogen atom, and that they contain, as curing catalysts (3), reaction products of chloroplatinic acid with ketones.

The diorganopolysiloxanes (1) possessing Si-bonded vinyl groups in the terminal units can be represented by the general formula

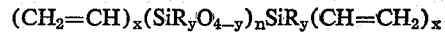

$$(CH_2=CH)_x(SiR_yO_{4-y})_n SiR_y(CH=CH_2)_x$$

In this formula, R denotes a monovalent, optionally substituted hydrocarbon radical, $x$ has an average value of 0.9 to 1.1, preferably 0.99 to 1.01, $y$ has an average value of 1.9 to 2.1, preferably 1.99 to 2.01, the sum of $x+y$ is 3 and $n$ is an integer having a value of at least 100. As is indicated, for example, by the average value of 1.9 to 2.1 for $y$, the diorganopolysiloxanes (1) can optionally contain, in addition to diorganosiloxane units, small amounts of siloxane units of a different degree of substitution, such as units of the formula $RSiO_{3/2}$.

Examples of hydrocarbon radicals in the diorganopolysiloxanes (1) and hence also of the hydrocarbon radicals R in the abovementioned formulae are alkyl radicals, such as methyl, ethyl, isopropyl and octadecyl radicals; alkenyl radicals, such as the vinyl radical and the decenly radicals; cycloaliphatic hydrocarbon radicals, such as the cyclohexyl radical, and aryl radicals, such as the phenyl radical. As an example of a substituted hydrocarbon radical, the 3,3,3-trifluoropropyl radical may be mentioned. In order to obtain coatings which are as flexible as possible, however, the hydrocarbon radicals in the diorganopolysiloxanes (1) which are not bonded to terminal Si atoms are preferably free of aliphatic multiple bonds and in particular are not vinyl groups. Because of their easier availability, preferably at least 50 percent of the number of the hydrocarbon radicals in the diorganopolysiloxanes (1) are methyl groups. The hydrocarbon radicals present in addition to the vinyl groups in the diorganopolysiloxanes (1) can be identical or different regardless of whether they are bonded to identical or different silicon atoms.

The diorganopolysiloxanes (1) can be identical copolymers or mixtures of different copolymers, each of the same degree of polymerization or mixtures of identical or different copolymers of different degrees of polymerization. The copolymers can be copolymers with statistical ("random") distribution of the various units, or can be block copolymers.

If a particularly high degree of non-stick character, coupled with high economy, for example in the manufacture of packaging for foodstuffs, is desired, all hydrocarbon radicals which are present in addition to the terminal vinyl groups in the diorganopolysiloxanes (1) should be methyl groups. If, however, a lesser degree of non-stick character is desired, for example for the manufacture of backings for self-adhesive labels, then this is best achieved through 3 to 30 mol percent, preferably 5 to 20 mol percent, of the non-terminal units in the diorganopolysiloxanes (1) being diphenylsiloxane units whilst at least 50 percent of the number of the hydrocarbon radicals in the remaining non-terminal units of the diorganopolysiloxanes (1) are methyl groups. The higher is the proportion of the diphenylsiloxane units, the lower is the degree of non-stick character.

If a particularly high speed of curing, coupled with good properties of the coating, is desired, it is advisable to use, as diorganopolysiloxanes (1) possessing Si-bonded vinyl groups in the terminal units, mixtures of (a) diorganopolysiloxanes containing Si-bonded vinyl groups in the terminal units, of viscosity 3,000 to 50,000 cst., preferably 5,000 to 10,000 cst., in each case measured at 25° C. and
(b) diorganopolysiloxanes containing Si-bonded vinyl groups in the terminal units, of viscosity 50,000 to 1,000,000 cst., preferably 100,000 to 200,000 cst., in each case measured at 25° C., with the proviso that at the same temperature the viscosity of the polysiloxane (b) is at least 50,000 cst. higher than the viscosity of the particular polysiloxane (a) which has been chosen. The low viscosity of the polysiloxane (a) contributes to the high speed of curing whilst the high viscosity of the polysiloxane (b) contributes to the good physical properties of the non-stick coating. The polysiloxanes (a) in most cases correspond to organopolysiloxanes of the abovementioned formula wherein $n$ is 100 to 500, whilst the polysiloxanes (b) in most cases correspond to organopolysiloxanes of the abovementioned formula in which $n$ is 1,500 to 3,000. The polysiloxanes (a) are preferably used in amounts of 25 to 75 percent by weight, especially 50 or about 50 percent by weight, in each case relative to the total weight of the organopolysiloxanes (a) and (b).

Because of easier accessibility, in particular, the terminal Si-bonded hydrogen atoms in the organopolysiloxanes (2) possessing at least 3 Si-bonded hydrogen atoms per molecule are present in units of the formula $$HSi(CH_3)_2O_{1/2}$$

For example, copolymers of trimethylsiloxane, dimethylhydrogenosilixane and methylhydrogenosiloxane units, and copolymers of dimethylhydrogenosiloxane, trimethylsiloxane and phenylhydrogenosiloxane, dimethylsiloxane and/or phenylmethylsiloxane units can be used. Because of the easier accessibility and high activity, organopolysiloxanes (2) of the general formula

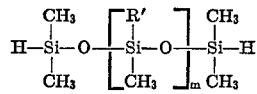

are preferred, wherein R' is hydrogen or the methyl radical, with the proviso that the number of R' which are hydrogen is such that the average ratio of the Si-bonded hydrogen atoms R' to the Si atoms in the R'Si(CH₃)O units is 0.25 to 0.5 and $m$ is an integer having a value of 10 to 500, preferably 20 to 100.

The proportion of the Si-bonded hydrogen in the organopolysiloxanes (2) is preferably 0.4 to 1.4 percent by weight, especially 0.4 to 0.5 percent by weight.

Preferably, the organopolysiloxanes (2) have a viscosity of 30 to 70 cp. at 25° C. The manufacture of organopolysiloxanes (2), including those of the preferred type, is known. It can be effected, for example, by mixed hydrolysis of dimethylchlorosilane, methyldichlorosilane and dimethyldichlorosilane or by equilibration of hydrolysis products of the silanes mentioned by means of an acid catalyst.

The organopolysiloxanes (2) are preferably used in amounts of 1 to 20 percent by weight, especially 10 to 15 percent by weight, in each case relative to the weight of the diorganopolysiloxanes containing Si-bonded vinyl groups in the terminal units.

To manufacture the reaction products, used according to the invention, of chloroplatinic acid (H₂PtCl₆·6H₂O) with ketones (3) monoketones are preferably used as ketones, since they are more easily accessible, and appropriately those which are free of aliphatic multiple bonds are used. Examples of ketones which can be employed preferentially in the manufacture of the curing catalysts (3) used according to the invention are thus cyclohexanone, methyl ethyl ketone, acetone, methyl n-propyl ketone, methyl iso-butyl ketone, methyl n-amyl ketone, diethyl ketone, ethyl n-butyl ketone, ethyl iso-amyl ketone, diisobutyl ketone and acetophenone.

If desired, however, ketones with more than one keto group, such as acetylacetone and/or aliphatic multiple bonds, such as mesityl oxide, can be used. Appropriately, the ketones do not contain more than 15 carbon atoms so that they should be liquid at room temperature and should evaporate sufficiently rapidly from the agents according to the invention when curing the coatings. Particularly good results are obtained with cyclohexanone. Since this requires least effort, the reaction products are appropriately employed in the form of solutions in which the solvent consists, to at least 20 times the amount of chloroplatinic acid employed, of the same ketone which has been employed for the manufacture of the reaction products, and are prepared and stored, for example, with a content of 0.05 to 0.5 percent by weight of Pt.

The reaction products are appropriately manufactured by dissolving chloroplatinic acid in the particular ketone chosen and heating the solution thus obtained for 5 minutes to 15 hours, preferably 0.5 hour to 6 hours, to 60–120° C., at the pressure of the surrounding atmosphere, that is to say at 760 mm. Hg (absolute) or about 760 mm. Hg (absolute), before bringing this solution into contact with the diorganopolysiloxanes (1) and/or the organopolysiloxanes (2). If desired, sub-atmospheric or super-atmospheric pressure can be used whilst heating in order to prepare the catalyst, but because of the greater effort required this is not preferred. If desired, but not preferentially, the heating during the preparation of the catalyst can also be replaced by allowing the solutions to stand at room temperature (about 18° C. to 25° C.) for at least 3 hours, appropriately at least 21 days, preferably with exclusion of light if they are left to stand for more than 24 hours. There is no upper limit to the duration of this leaving to stand. This limit is solely determined by economic considerations.

Proof that reaction products have formed to a sufficient extent can be most simply brought by mixing about 0.2 mg. of Pt in the form of, for example, a solution containing 0.05 to 0.5 percent by weight of Pt, manufactured by dissolving chloroplatinic acid in ketone, after heating and leaving to cool at room temperature, or leaving to stand at room temperature, with a mixture of 0.05 mol of trichlorosilane and 0.05 mol of allyl chloride and ascertaining whether a significant temperature rise, for example of at least 2° C., occurs within about one minute. Such proof can, however, also be brought by other methods, for example observing the change in the infrared spectrum or determining the water liberated.

It is advisable to remove the water liberated during the reaction or as a result of heating, from the solutions of the reaction products of chloroplatinic acid with ketones, for example by means of drying agents, such as anhydrous sodium sulphate, or already during heating, for example by means of a water trap mounted underneath the reflux condenser, before these solutions are brought into contact with the diorganopolysiloxanes (1) and/or organopolysiloxanes (2).

The platinum catalysts are appropriately used in amounts of 0.001 to 0.1 percent by weight, preferably 0.01 to 0.05 percent by weight, in each case calculated as elementary platinum and related to the weight of the organopolysiloxanes containing vinyl groups.

Further organic solvents can be used conjointly in addition to the ketone which is introduced with the catalysts used according to the invention into the mixture of diorganopolysiloxane (1) and organopolysiloxane (2). These further solvents should be as anhydrous as possible and should be inert towards the compounds to be dissolved therein. Furthermore, these organic solutions should rapidly evaporate at 70° to 180° C. and 760 mm. Hg (absolute). Examples of suitable solvents are or can be hydrocarbons, such as benzines, for example alkane mixtures with a boiling range of 80 to 110° C. at 760 mm. Hg (absolute), benzene, toluene and xylenes; ethers, for example di-n-butyl ether; esters, for example ethyl acetate, and further amounts of ketone and/or other ketones than have been used for the preparation of the catalyst solution. Because of easier accessibility, hydrocarbons, especially benzines, are preferred as the predominant constituent of the solvents. The solvents used conjointly with an additionally to the ketone which is introduced with the catalyst into the mixture of diorganopolysiloxane (1) and organopolysiloxane (2), are appropriately employed in amounts of 200 to 5,000 percent by weight, relative to the weight of the diorganopolysiloxanes (1) possessing Si-bonded vinyl groups in the terminal units.

To prepare the agents according to the invention, the diorganopolysiloxanes (1) possessing Si-bonded vinyl groups in the terminal units, the organopolysiloxanes with at least one terminal Si-bonded hydrogen atom (2), which possess at least 3 Si-bonded hydrogen atoms per molecule, reaction products of chloroplatinic acid with ketone (3) and the optionally conjointly used solvents are mixed with one another in optional sequence. The solutions thus obtained, which are ready to use for the manufacture of the non-stick coatings, can advantageously be storted at room temperature for at least 7 days or be stored in the supply reservoirs of the apparatuses for the manufacture of the coatings, without gelling of the solutions occurring or without the speed of curing of the coatings at higher temperatures being impaired.

If the surfaces which are to be given non-stick character are non-absorbent or are only slightly absorbent, the diorganopolysiloxanes (1) and the organopolysiloxanes (2) are appropriately employed in amounts of a total of 0.1 to 0.5 g. per m.$^2$ of surface which is to be given non-stick character. If the surfaces to be given non-stick character are absorbent, the organopolysiloxanes containing vinyl groups and Si-bonded hydrogen are appropriately employed in amounts of a total of 1 to 3 g. per m.$^2$ of surface which is to be given non-stick character. The use of excess organosilicon compounds and hence also of platinum catalyst in the case of absorbent surfaces can be avoided if these surfaces are pre-treated with pore-sealing substances, for example a solution of polyvinyl alcohol in water or of polyvinyl acetate in an organic solvent.

The application of the agents according to the invention onto the surfaces to be given non-stick character can be effected in any desired manner which is known for the manufacture of coatings from liquid substances, for example by dipping, spreading, casting, spraying, roller application, printing, knife coating or doctor blade coating, including coating with a Meyer rod.

In order to remove the solvents rapidly and to accelerate the curing of the coatings, the latter must be warmed to at least 80° C. In order to avoid damaging the substrates which are to be given non-stick character, such as paper, and/or damaging the coatings, the temperature should not exceed 200° C. during this warming. It is particularly advantageously to raise the temperature to 140°–160° C.

Using the agents according to the invention, non-stick coatings can be produced on any desired solid surfaces, for example on paper, cardboard, wood, cork, plastic films, cotton fabrics, metals, glass and ceramic articles. The agents according to the invention are thus suitable, for example, for the manufacture of release, covering and interleaving papers, cardboards, films and cloths, for finishing the rear face of self-adhesive tapes and self-adhesive films or the inscribed sides of self-adhesive labels, and also for finishing packaging material, such as paper, cardboard boxes, metal films and drums, for example of cardboard, plastic or wood, iron and other solid materials, which is intended for the storage and/or transportation of sticky foodstuffs, such as honey, cakes and other confectionery, for example bonbons, and also meat or adhesives, including the case of the so-called "transfer process," or other sticky substances, such as self-adhesive labels, raw rubber, asphalt or bitumen.

In the examples which follow, all parts and percentages quoted are in each case by weight unless otherwise stated. The examples are intended to explain the invention without restricting it.

The catalyst solution used according to the invention in the examples below was manufactured as follows: 1 g. of chloroplatinic acid is added over the course of 30 minutes to 200 g. of cyclohexanone heated to 80° C. The solution thus obtained is then warmed to 80° C. for 45 minutes and subsequently dried by means of anhydrous sodium sulphate.

EXAMPLE 1

(a) 2.5 parts of a dimethylpolysiloxane possessing vinyldimethylsiloxy groups as terminal units, with a viscosity of 7,000 cst. at 25° C., are first mixed with 2.5 parts of a dimethylpolysiloxane possessing vinyldimethylsiloxy groups as terminal units and having a viscosity of 150,000 cst. at 25° C. and then with 0.4 part of the catalyst solution of which the manufacture has been described above.

The mixture thus obtained is first dissolved in 10 parts of toluene and diluted with 84 parts of an alkane mixture of boiling range 80° C. to 110° C. at 760 mm. Hg (absolute). The diluted solution is mixed with 0.7 part of a copolymer of dimethylhydrogenosiloxane, methylhydrogenosiloxane and dimethylsiloxane units containing 0.45% of Si-bonded hydrogen and having a viscosity of 40 cst. at 25° C.

(b) A glassyne paper web is roller-coated with this solution, shortly after its manufacture, in a continuously operated installation. In the course of the coating, the paper absorbs about 0.5 g. of organosilicon compounds per m.$^2$. After the coating, the paper is passed through a drying tunnel. The air in the drying tunnel is at a temperature of 150° C. A part of the paper web is passed through the drying tunnel at a speed of 120 m./minute, a further part of the paper web is passed through at a speed of 150 m./minute and a third part of the paper web is passed through at a speed of 180 m./minute, corresponding to dwell times of 8 seconds, 6 seconds and 5.4 seconds respectively. At all these speeds, the coating is completely cured on leaving the drying tunnel, adheres firmly to the substrate and is very rub-resistant.

If the glassyne paper coated as described above is used for covering self-adhesive films, it shows excellent release properties without impairing the adhesive strength of the self-adhesive films even after prolonged storage.

EXAMPLE 2

In order to illustrate the long pot life of the agents according to the invention, the measures described in Example 1 were repeated with the modification that the finished solution was stored for 8 days at room temperature before the glassyne paper web was coated with it. The same good results were obtained.

EXAMPLE 3

A glassyne paper web is coated by means of a doctor blade, in a continuously operated installation, with the solution of which the manufacture was described in Example 1 under (a), the doctor blade used being a rod wrapped with 0.2 mm. thick stainless steel wire, and the web being passed through the drying tunnel with a dwell time of 5 seconds. The air in the drying tunnel is at a temperature of 150° C.

Samples of the paper web coated in this way are tested with regard to the degree of non-stick character, that is to say the so-called "release force level":

2 strips of self-adhesive tape ("Tesafilm red" No. 154 of Messrs. Beiersdorf), of 3 cm. width, are placed on the coating and pressed down by means of a rubber roller, using a force of 15 kg./cm. Thereafter, one tape is immediately pulled off at a speed of 30 cm./minute whilst the other tape is pulled off at the same speed only after ageing by warming to 70° C. for 20 hours under a load of 20 g./cm.$^2$, and the force which is required to pull off the adhesive tapes is measured. Before and after ageing, the release force level is 0 to 6 g./cm. The adhesive strength of the adhesive tape is in each case unchanged after pulling off.

Comparison experiments 1

I(a). 2.5 parts of a dimethylpolysiloxane containing vinyldimethylsiloxy groups as terminal units and having a viscosity of 700 cst. at 25° C. are firstly mixed with 2.5 parts of a dimethylpolysiloxane possessing vinyldimethylsiloxy groups as terminal units and having a viscosity of 150,000 cst. at 25° C., and the mixture thus obtained, having a mean viscosity of 45,000 cp. at 25° C., is mixed, as a significant modification relative to Example 1, with 1 part of a solution, containing 0.5% of Pt, of a reaction product of chloroplatinic acid and alcohol, according to German Auslegeschrift 1,257,752. This catalyst solution was manufactured as follows:

5.4 g. of chloroplatinic acid in 100 g. of n-octanol are warmed for 18 hours to 60° C. at 20 mm. Hg (absolute). The excess n-octanol is then distilled off at 20 mm. Hg (absolute). The residue is taken up in 393 g. of benzene.

The mixture of organopolysiloxanes and catalyst solution is first dissolved in 10 parts of toluene and then diluted with 72 parts of an alkane mixture having a boiling range of 80° C. to 110° C. at 760 mm. Hg (absolute). The diluted solution is mixed with 0.7 part of the copolymer described in Example 1, which contains Si-bonded hydrogen.

(b) Glassyne paper is coated with the solution thus obtained, using a doctor blade which consists of a stainless steel rod wrapped and 0.2 mm. thick stainless steel wire. After curing, the coating admittedly adheres firmly to the substrate and is very rub-resistant, like the coatings according to Example 1; furthermore, in carrying out the test of the release force level, described in Example 3, the value of 0 to 6 g./cm. before and after ageing was obtained as in Example 3. However, in contrast to the 5 seconds of Example 3, curing in a drying cabinet requires 15 seconds.

II. The procedures described under (I) are repeated with the modification that before application to the paper the finished coating solution manufactured according to (a) is left to stand for 8 hours. The coating is then not yet fully cured even after 120 seconds at 150° C. and the adhesive strength of self-adhesive tape applied thereto is impaired.

Comparison experiments 2

I. The procedures described in comparison experiment 1 under (I) are repeated with the modification that instead of the catalyst solution used there, 3 parts of a solution, containing 0.4% of Pt, of a reaction product of platinum tetrachloride and cyclohexene (compare U.S.A. Patent Specification 3,178,464 or M. S. Kharasch et al., "Journal of the American Chemical Society," volume 58, 1936, page 1733) in benzene are used. After curing, the coating admittedly adheres firmly to the substrate and is very rub-resistant, like the coatings according to Example 1; furthermore, on testing the release force level as in Example 3 a value of 0 to 6 g./cm. is obtained before and after ageing. However, in contrast to the 5 seconds of Example 3, curing in a drying cabinet requires 30 seconds.

II. The procedures described under (I) are repeated with the modification that the finished coating solution manufactured according to (a) is left to stand for 8 hours before application to the paper. The coating is then not yet fully cured even after 120 seconds at 150° C. and the adhesive strength of self-adhesive tape applied thereto is impaired.

We claim:

1. A non-stick organopolysiloxane coating composition comprising (1) a diorganopolysiloxane having terminal Si-bonded vinyl groups in which the organo groups are free of vinyl groups and are selected from the group consisting of monovalent hydrocarbon radicals and halogenated monovalent hydrocarbon radicals, (2) an organopolysiloxane having at least three Si-bonded hydrogen atoms per molecule with at least one hydrogen atom being bonded to the terminal silicon atom and the remaining groups being monovalent hydrocarbon radicals and (3) a platinum curing catalyst obtained from the reaction of chloroplatinic acid and a ketone having up to 15 carbon atoms.

2. The composition of claim 1, wherein the diorganopolysiloxane (1) is a mixture of a diorganopolysiloxane having terminal Si-bonded vinyl groups and a viscosity of from 5,000 to 10,000 cst. at 25° C. and a diorganopolysiloxane having terminal Si-bonded vinyl groups and a viscosity of from 100,000 to 200,000 cst. at 25° C.

3. The composition of claim 1 wherein the curing catalyst (3) is obtained from the reaction of chloroplatinic acid and cyclohexanone.

4. The composition of claim 1 wherein the catalyst calculated as elemental platinum is present in an amount of from 0.001 to 0.1 percent by weight based on the weight of the diorganopolysiloxane (1).

5. The composition of claim 1 wherein the organopolysiloxane (2) has the general formula

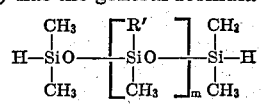

wherein R' is selected from the group consisting of hydrogen atoms and methyl radicals, and the number of R's which are hydrogen is such that the average ratio of the Si-bonded atoms R' and the Si atoms in the R'Si(CH₃)O units is 0.25 to 0.5 and $m$ is an integer having a value of 20 to 100.

References Cited

UNITED STATES PATENTS 3,383,356  5/1968  Nielsen _____ 260—46.5
3,627,851  12/1971  Brady _____ 260—825

DONALD E. CZAJA, Primary Examiner

M. I. MARQUIS, Assistant Examiner

U.S. Cl. X.R.

117—123 D, 124 F, 138.8 R, 139.5 A, 148; 252—429 R, 431 R; 260—448.2 Q